United States Patent
Szymanski et al.

(10) Patent No.: US 10,042,878 B2
(45) Date of Patent: Aug. 7, 2018

(54) SYSTEM FOR AUTOMATED VALIDATION OF DATA POINTS WITHIN A DATA RECORD

(71) Applicant: BANK OF AMERICA CORPORATION, Charlotte, NC (US)

(72) Inventors: Laima A. Szymanski, Grand Junction, CO (US); Manu Jacob Kurian, Dallas, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 234 days.

(21) Appl. No.: 15/188,641

(22) Filed: Jun. 21, 2016

(65) Prior Publication Data

US 2017/0364547 A1 Dec. 21, 2017

(51) Int. Cl.
G06F 17/00 (2006.01)
G06F 17/30 (2006.01)
G06F 17/27 (2006.01)

(52) U.S. Cl.
CPC ...... G06F 17/30371 (2013.01); G06F 17/273 (2013.01); G06F 17/2705 (2013.01); G06F 17/30377 (2013.01)

(58) Field of Classification Search
CPC ............... G06F 17/30; G06F 17/30371; G06F 17/30377
USPC .................................................. 707/600–899
See application file for complete search history.

(56) References Cited

U.S. PATENT DOCUMENTS 9,542,416 B2 * 1/2017 Watson ............. G06F 17/30286

* cited by examiner

*Primary Examiner* — Isaac M Woo
(74) *Attorney, Agent, or Firm* — Michael A. Springs; Moore & Van Allen PLLC; James C. Edwards

(57) ABSTRACT

Disclosed are systems and the like that provide automated validation of data points within a data record. Specifically, validation the correctness/existence of a data point, as well as, the association between the data point and a related entity. Moreover, in specific embodiments of the invention, in which data points are determined to be invalid, publically-accessible information may be retrieved from a distributed communications network and data analytics may be implemented to automatically determine/identify valid data points.

19 Claims, 4 Drawing Sheets

SYSTEM FOR AUTOMATED VALIDATION OF DATA POINTS WITHIN A DATA RECORD

FIELD OF THE INVENTION

The present invention relates to data validation and, more specifically, implementing information stored in a distributed communication network and/or communicating validating requests to an associated entity to automatically validate data points/entries in a data record.

BACKGROUND

In many instances, entry of data, referred to herein as data points, into data records requires validation to insure the correctness and accuracy of such data. Such is especially the case in those instances in which data is manually entered into a data record because manual entry is prone to oversights and typographical errors. In other instances the data entrant may be entering, either with or without knowledge, inaccurate data. However, manual validation of the data, in which the data entrant or the source of the data is queried as to the validity of the data is neither practical, efficient in terms of time exhausted nor assures that the data is, in fact, valid.

In further instances, in which the data may change over time, the data not only requires validation at the data entry phase, but also requires validation over time to insure the continual validity of the data points within a data record.

Therefore, a need exists to validate or otherwise authenticate data points within a data record. The desired systems, apparatus, methods and the like should not only validate, i.e., insure the existence and accuracy/correctness, of data points at the data entry level (i.e., at the inception of the data record) but also provide for continual data point validation/authentication over time so as to insure that as data points may change over time, the new/updated data points are validated/authenticated. Moreover, in the event that data points are determined to be invalid, a need exists to automatically identify/determine valid data points without requiring input from the data entrant and/or the entity associated with the data point.

SUMMARY

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, computer program products, for automated validation of data points within a data record. The automated validation process herein described assures correctness of the data points, as well as, validates the association between the data point and an entity associated with the data point. In specific embodiments of the invention, automated validation may including accessing information stored in a distributed computing network, such as publically-accessible databases and the like, to validate data points. For example, publically-accessible databases may be searched for information stored in the databases that are associated with the entered data points. Data analytics may be implemented to determine matches or partial matches between the information stored in the databases and the data point(s). Confidence levels/scores may be used to assess the likelihood of validation/authentication based on the completeness of matches, the volume of matches and/or the type/category of database and or information stored in the databases. In other embodiments of the invention, automated validation may include automated communication(s) to an entity associated with the data point, such that the response to the communication serves to validate (or invalidate) the data point.

In addition, in those embodiments in which a data point is determined to be invalid, embodiments of the invention, provide for an automated means of identifying/determining a valid data point. In such embodiments of the invention, publically-accessible databases, distributed throughout one or more communication networks may be accessed and searched for information stored in the databases that are associated with the entered data points. Data analytics may be implemented to determine matches or partial matches between the information stored in the databases and the data point(s). Confidence levels/scores may be used to assess the likelihood of validation/authentication based on the completeness of matches, the volume of matches and/or the type/category of database and or information stored in the databases. Threshold confidence level/scores may be defined, which, once attained, may deem an identified data point as being valid.

A system for automated validation of data points within a data record defines first embodiments of the invention. The system includes one or more distributed electronic communication networks that are configured to provide network access to information associated with a data record. The system additionally includes a computing platform in network communication with the distributed electronic communication network(s) that includes a memory and a processor in communication with the memory. Further, the system includes a data point validation module that is stored in the memory and executable by the processor. The module is configured to validate (1) correctness of the data point, and (2) association between the entity and the data point by performing at least one of (i) communicating, via one or more of the distributed electronic communication networks, a validation request to an entity associated with the data record, and (ii) accessing, via one or more of the distributed electronic communication networks, the information associated with the data record.

In specific embodiments of the system, the module is further configured to perform (i) and (ii) in immediate response to entry of the data point within the data record or completion of the data record.

In other specific embodiments of the system, the module is further configured to, in response to communicating the validation request to an entity associated with the data record receive a validation response from the entity that either validates the correctness of the data point or validates the association between the entity and the data point. In further specific embodiments of the system, the module is further configured to, in response to communicating the validation request to an entity associated with the data record, receive a validation response from the entity that invalidates the correctness of the data point and provides one or more suggestions for a correct data point.

In other specific embodiments of the system, the module is further configured to, in response to access the information associated with the data record, retrieve and analytically analyze the information to determine one or more matches in the information to the data point.

In additional embodiments the system includes a data point determination module that is stored in the memory and executable by the processor. The module is configured to, in response to the data point validation module determining that the data point is invalid in terms of the association between the entity and the data point, access data point-related information from at least one of one or more social media sites and one or more publically-accessible databases to identify a valid data point associated with the entity. In such embodiments of the system, the module is further configured to identify the valid data point by analytically analyzing the data point-related information to determine (i) a level of confidence that the valid data point is associated with the entity, and (ii) and the level of confidence exceeds a threshold for data point validity.

In additional embodiments of the system, the data point determination module may further configured to access data point-related information from at least one of one or more social media sites and one or more publically accessible databases to identify a one or more additional data points associated with the entity and of a same type as the data point being validated. In such embodiments of the system, the module is further configured to determine entity priority for the one or more additional data points and the data point. Entity priority defines an entity prevalence (i.e., frequency) in using the data point.

In specific embodiments of the system, in which the data point is an email (electronic mail) address, the data point validation module is further configured to validate the correctness of the email address in terms of syntax, domain and domain name, and validate that the email address is associated with the entity. In further such embodiments of the system, the data point validation module is further configured to validate that the email address is associated with the entity by performing at least one of sending an email to the email address and conducting a SMTP (Simple Mail Transfer Protocol) check at a server associated with a domain name in the email address.

In other specific embodiments of the system, in which the data point is a telephone number, the data point validation module is further configured to validate that the telephone number is associated with the entity by, at least one of, making an automated voice call to the telephone number and communicating a text message to the telephone number. The automated voice call and the text message are configured to request the entity respond to the request with a designated code to validate the telephone number.

In still further specific embodiments of the system, in which the data point is a physical address, the data point validation module is further configured to validate the correctness of the physical address by communicating with a publically-accessible address registry. Further, the module is configured to validate that the physical address is associated with the entity by at least one of (i) retrieving the information associated with the data record, and analytically analyze the information to determine one or more matches in the information to the physical address, (ii) making an automated voice call or communicating a text message to the entity, in which the automated voice call and the text message are configured to require the entity to respond with a designated code to validate the physical address, and (iii) sending an information packet to the physical address, which requests that the entity respond to the request with a designated code to validate the physical address.

An apparatus for automated validation of data points within a data record defines second embodiments of the invention. The apparatus includes a computing platform in network communication within the distributed electronic communication network and including a memory and a processor in communication with the memory. The apparatus further includes a data point validation module that is stored in the memory and executable by the processor. The module is configured to validate (1) correctness of the data point, and (2) association between the entity and the data point by performing at least one of (i) communicating, via one or more distributed electronic communication networks, a validation request to an entity associated with the data record, and (ii) accessing, via one or more distributed electronic communication networks, information associated with the data record.

In specific embodiments of the apparatus, the data point validation module is further configured to, in response to communicating the validation request to an entity associated with the data record, receive a validation response from the entity that either validates the correctness of the data point or validates the association between the entity and the data point. In other specific embodiments of the apparatus, the data point validation module is further configured to, in response to communicating the validation request to an entity associated with the data record, receive a validation response from the entity that invalidates the correctness of the data point and provides one or more suggestions for a correct data point.

In still further specific embodiments of the apparatus, the data point validation module is further configured to, in response to accessing the information associated with the data record, retrieve and analytically analyze the information to determine one or more matches in the information to the data point.

In other specific embodiments the apparatus includes a data point determination module that is stored in the memory and executable by the processor. The module is configured to, in response to the data point validation module determining that the data point is invalid in terms of the association between the entity and the data point, access data point-related information from at least one of one or more social media sites and one or more publically accessible databases to identify a valid data point associated with the entity.

A computer program product for automated validation of data points within a data record defines third embodiments of the invention. The computer program product includes a non-transitory computer-readable storage medium having computer-executable instructions. The computer-executable instructions validate (1) correctness of the data point, and (2) association between the entity and the data point by performing at least one of (i) communicating, via one or more distributed electronic communication networks, a validation request to an entity associated with the data record, and (ii) accessing, via one or more distributed electronic communication networks, information associated with the data record.

Thus, systems, apparatus, methods, and computer program products herein described in detail below provide automated validation of data points within a data record. Specifically, embodiments of the invention provide for validating the correctness of a data point, as well as, the association between the data point and a related entity. Moreover, in specific embodiments of the invention, in which data points are determined to be invalid, valid data points are automatically determined/identified. As such, the present invention provides an effective, efficient and accurate means for automatically validating data points in a data record.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
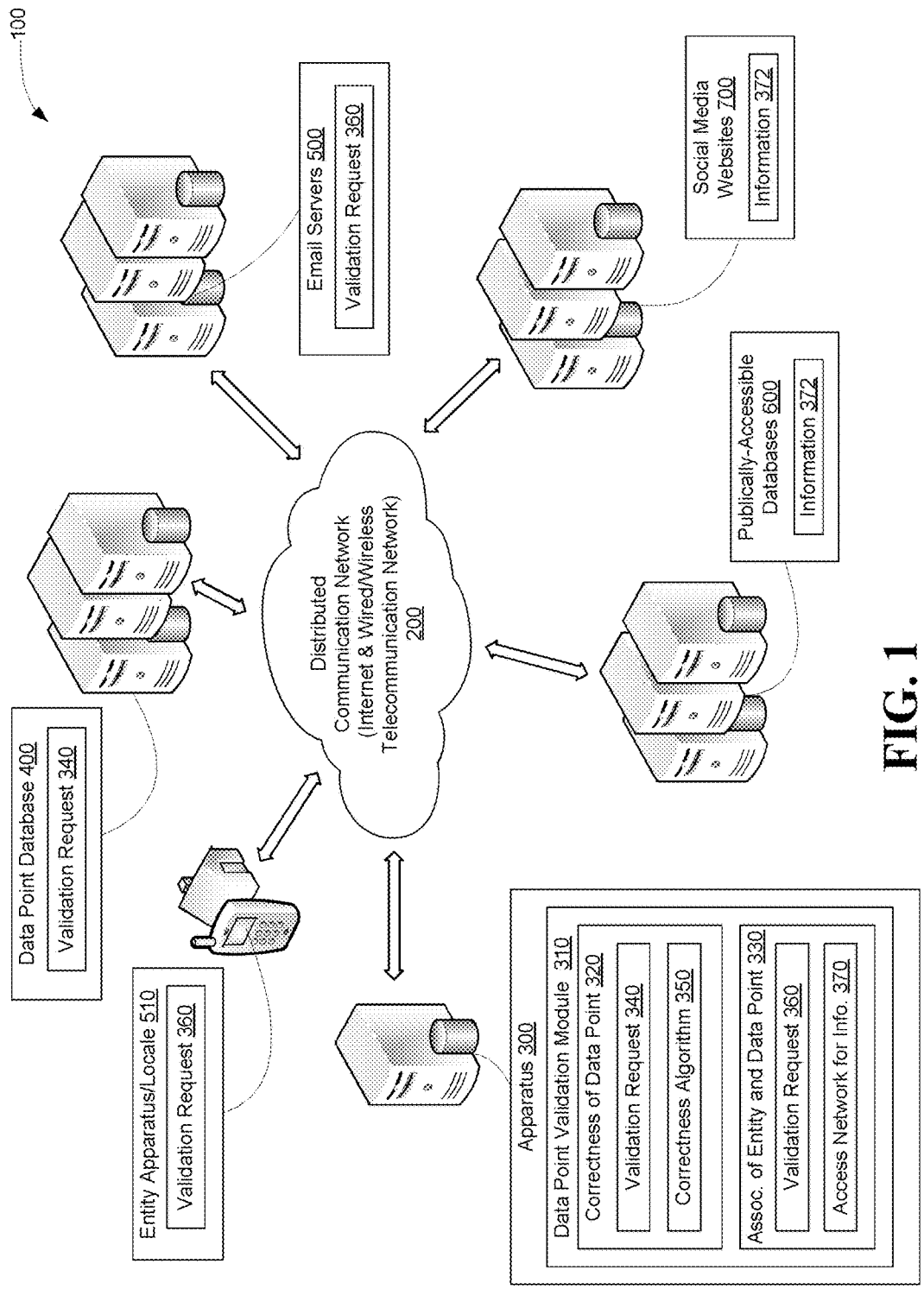
Figure 2:
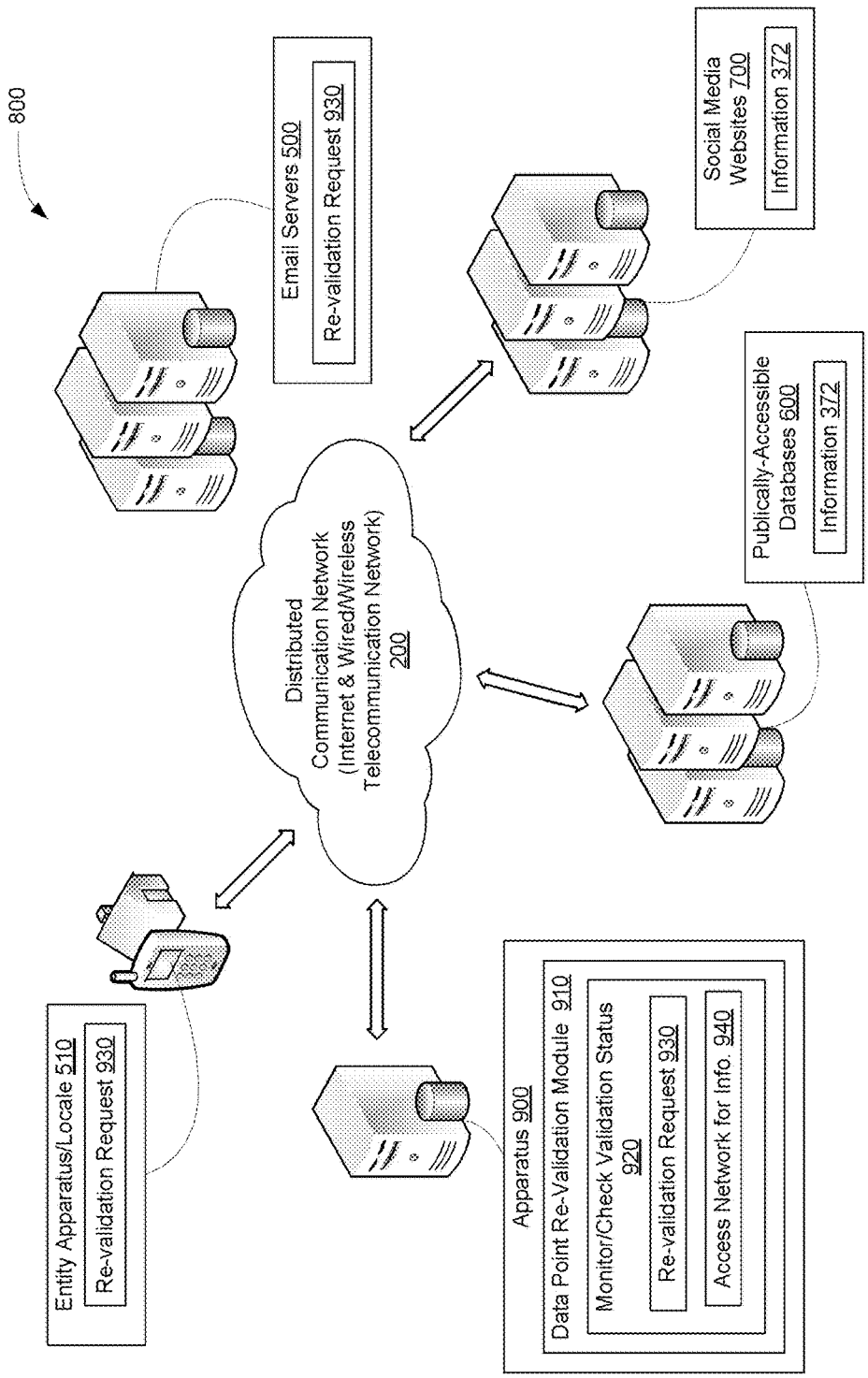
Figure 3:
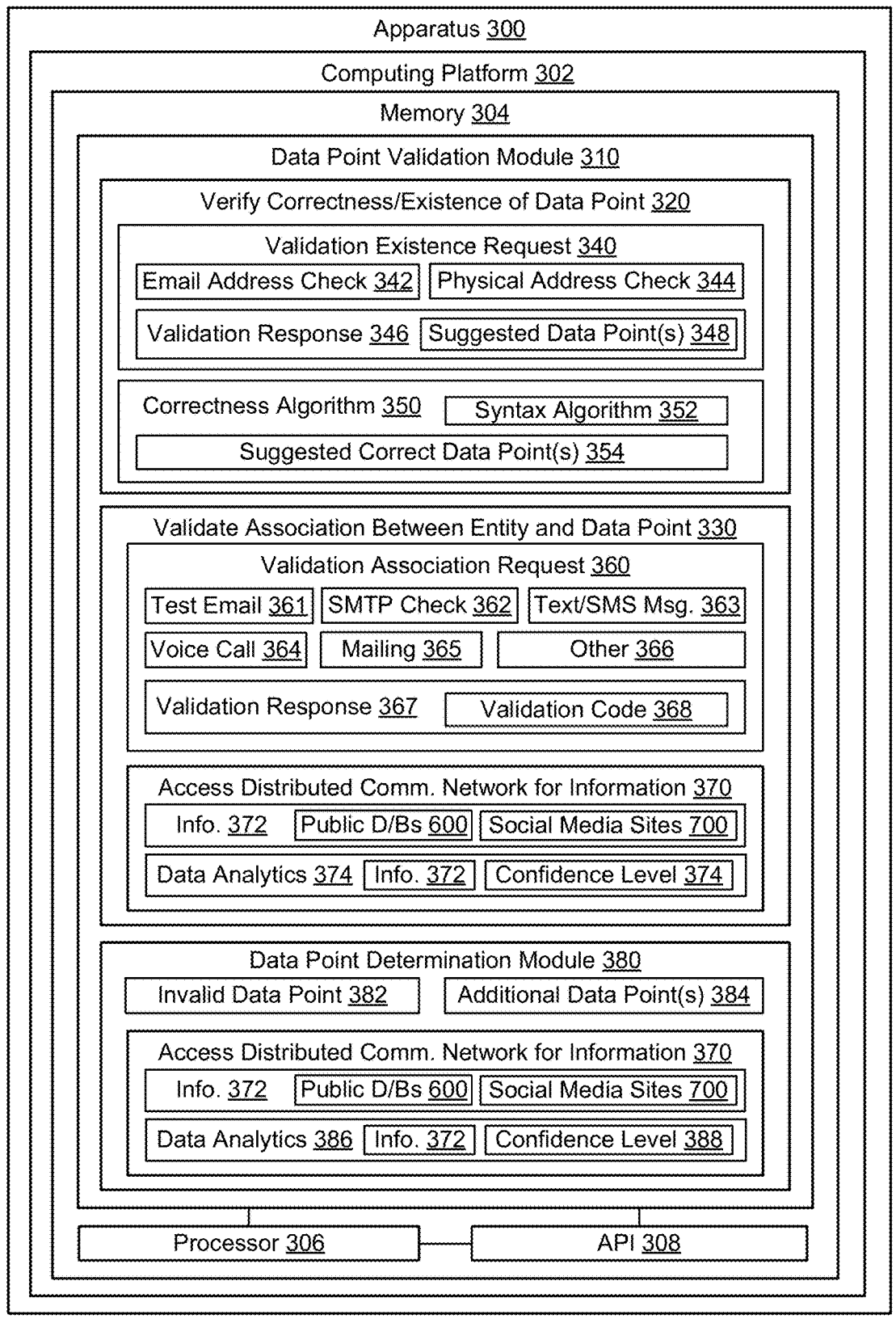
Figure 4:
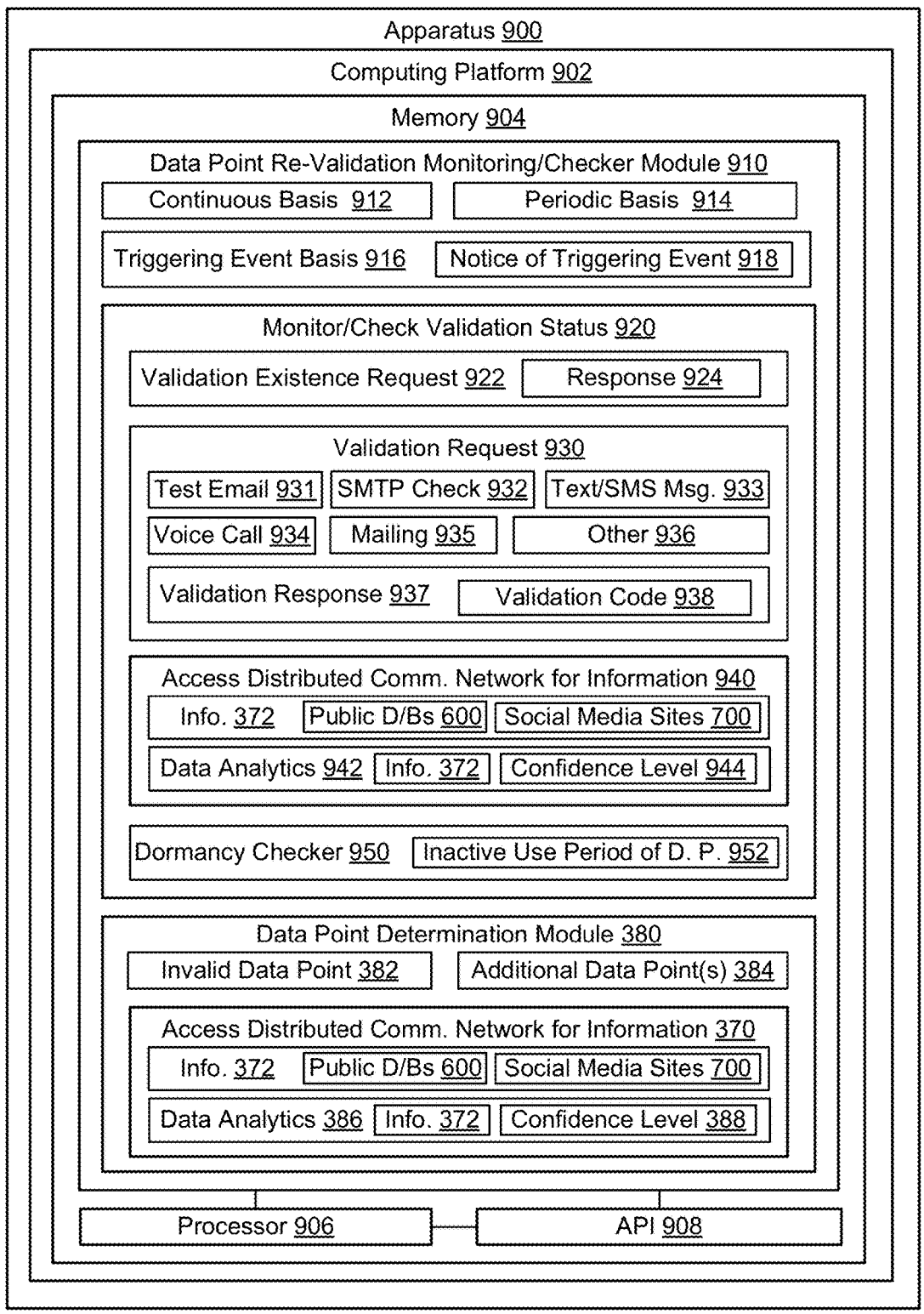

Having thus described embodiments of the invention in general terms, reference will now be made the accompanying drawings, wherein:

FIG. 1 provides a schematic diagram of an exemplary system for initial validation of data points in a data record, in accordance with embodiments of the present invention;

FIG. 2 provides a schematic diagram of an exemplary system for monitoring the validation (otherwise, referred to herein as re-validating) data points in a data record, in accordance with embodiments of the present invention;

FIG. 3 provides a block diagram of an apparatus for initial validation of data points in a data record, in accordance with embodiments of the present invention; and FIG. 4 provides a block diagram of an apparatus for monitoring the validation (otherwise, referred to herein as re-validating) data points in a data record, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for automated validation of data points within a data record. The automated validation process herein described assures correctness of the data points, as well as, validates the association between the data point and an entity associated with the data point. For example, in specific embodiments of the invention the data record may be a contact record associated with a customer/client/vendor or the like and the data points may include email address(es), telephone number(s), physical address(es), name(s) and the like. The data entrant, which may be one of the contacts (i.e., an entity associated with the data record) or someone entering the data on behalf of the contact, may provide incorrect/inaccurate data, either knowingly or unknowingly (e.g., typographical error or the like). As such, the automated validation process of the present invention provides for validation/authentication of the correctness of the data point (i.e., confirmation that the data point exists, e.g., actual email address, actual physical address) and validation that the data point is, in fact, associated with the entity/contact (e.g., the email address is an email address associated with the entity/contact, the physical address is an address at which the entity/contact is located and the like).

In specific embodiments of the invention, automated validation of the correctness of the data point may provide for performing syntax checks (e.g., in those embodiments in which the data point is an email address, insuring that the email address has an "@" sign, proper punctuation, actual domain and the like) or checking publically-accessible databases to insure existence of the data point (e.g., in those embodiments in which the data point is a physical address, checking with public address checker service or the like).

In specific embodiments of the invention, automated validation of the association between the data point and the entity may include accessing information stored in a distributed computing network, such as publically-accessible databases and the like, to validate data points. For example, in those embodiments in which the data record is a contact record, publically-accessible databases, such as social media-related website databases, government-related repositories and the like, may be searched for information stored in the databases that are associated with the entered data points (e.g., email addresses, physical addresses, telephone numbers associated with the contact/entity name, other data points or the like). Once the information is retrieved from the databases, data analytics may be implemented to determine matches or partial matches between the information stored in the databases and the data point(s). Confidence levels/scores may be used to assess the likelihood of validation/authentication based on the completeness of matches, the volume of matches and/or the type/category of database and/or information stored in the databases. In specific embodiment, a confidence level/score threshold must be met to deem the data point as validated.

In other embodiments of the invention, automated validation of the association between the data point and the entity may include automated communication(s) to an entity associated with the data point, such that the response to the communication serves to validate (or invalidate) the data point. For example, in those embodiments in which the data record is a contact record and the data point is an email address, an automated test email may be sent to the email address or an automated Simple Mail Transfer Protocol (SMTP) check may be performed at a server associated with the domain name. In those embodiments in which the data record is a contact record and the data point is a telephone number, an automated voice call or text message to the telephone number may be made to validate that the telephone number is associated with the entity/contact.

In addition, in those embodiments in which a data point is determined to be invalid, embodiments of the invention, provide for an automated means of identifying/determining a valid data point. In such embodiments of the invention, publically-accessible databases, distributed throughout one or more communication networks may be accessed and searched for information stored in the databases that are associated with the entered data points. Data analytics may be implemented to determine matches or partial matches between the information stored in the databases and the data point(s). Confidence levels/scores may be used to assess the likelihood of validation/authentication based on the completeness of matches, the volume of matches and/or the type/category of database and or information stored in the databases. Threshold confidence level/scores may be defined, which, once attained, may deem an identified data point as being valid.

Referring to FIG. 1, a schematic diagram is provided of a system 100 for validating data points in a data record, in accordance with embodiments of the present invention. The system 100 is implemented amongst one or more distributed communication networks 200, which may include the Internet and/or wireless or wired telecommunications networks. System 100 includes apparatus 300 which stores data point validation module 310 that is configured to validate, otherwise referred to as authenticate or verify, data points in a data record. In specific embodiments of the invention, the data point validation module 310 is implemented in conjunction with an electronic data record, such that in response to entry of a data point in a data record and/or in response to completion of the data record data points are automatically validated.

Validation includes correctness/existence 320 of data point, which checks to insure that accuracy and existence of the data point. In specific embodiments of the system, the correctness/existence 320 check includes generating and initiating communication of a validation request 340 via the distributed communication network 200. For example, the validation request 340 may be communicated to one of a plurality of data point databases 400 that store listings of data points or portions or date points, such the data point entered in the data record can be compared to the listings to confirm the existence of the data point. In other specific embodiments of the system, the correctness/existence 320 check includes one or more correctness algorithms 350 that are applied to the entered data point to validate the correctness of the data point in terms of syntax and/or format applicable to the type of data defined by the data point.

Validation additionally includes validating association 330 between the data point and an entity, which may comprise an individual or a group of individuals. In other words, verifying that the data point is, in fact, a data point that is associated with (i.e., tied to, related to, or the like) the entity. In specific embodiments of the system, the association 330 validation includes generating and initiating communication of a validation request 360 via the distributed communication network 200. In those embodiments in which the data point is an electronic mail address (email address), the validation request 360 may be communicated to an email server 500, in the form of a test email to the entity or a Simple Mail Transfer Protocol (SMTP) check to the email server associated with the domain name. In other embodiments of the invention, in which the data point is a telephone number or physical address, the validation request 360 may be communicated to an entity's apparatus 510 (e.g., mobile communication device), in the form of a voice call or text/SMS (Short Message Service) message or to the locale 510 associated with the entity, in the form of a mailing.

In other embodiments of the system, validating association 330 between the data point and an entity includes accessing 370, via the distributed communication network 200, information 372 associated with the data point. For example, the information may be stored or otherwise accessible, at publically-accessible databases 600 and/or social media websites 700. The system 100 may further include a data analytics engine (not shown in FIG. 1) that analyzes the information accessed and retrieved from the publically-accessible databases 600 and/or social media websites 700 to determine if matches exist between the data point and the information. In specific embodiments of the invention, a confidence level/score may be determined based on the completeness of the match(es), the volume of matches, the types of publically-accessible databases 600 and/or social media websites 700 from which the matched information came from and the like. In specific embodiments of the system, the confidence level/score may be compared to a threshold confidence level/score to determine if the data point can be deemed valid. The data analytics engine may be implemented in conjunction with a heuristics engine (not shown in FIG. 1) that takes into account historical data associated with previous results of the data analytics engine as they apply to the entity and/or the specific data point being validated.

Referring to FIG. 2, a schematic diagram is provided of a system 800 for monitoring/checking, over time, the validation of data points in a data record, otherwise referred to herein as re-validating data points, in accordance with embodiments of the present invention. Similar, to the initial validation system 100 shown in FIG. 1, the system 800 is implemented amongst one or more distributed communication networks 200, which may include the Internet and/or wireless or wired telecommunications networks. System 100 includes apparatus 900 which stores data point re-validation module 910 that is configured to monitor or check the validation of data points, otherwise referred to as re-validate, re-authenticate or re-verify the data points in a data record. In specific embodiments of the invention, the data point re-validation module 910 is implemented in a continuous and/or ongoing basis. In this regard, the re-validation or a portion of the re-validation may occur in real-time or near real-time depending the ability to access validation-related information in real-time or near real-time. In other embodiments of the invention, the data point re-validation module 910 is implemented on a periodic basis, such as a predetermined scheduled basis. In such instances, certain validations/tests/checks included in the overall validation process may each have a specified predetermined schedule, such that, one or more specific validations/checks may occur more frequently (e.g., once a day, once a week, once a month or the like), while other specific validation/checks may occur less frequently (e.g., once every six months, once every year or the like). The frequency at which validations/checks are performed may depend on the level of importance of the data point, the ability to continually access the validation information and the any other relevant factors.

Re-validation includes monitoring/checking validation status 920 (i.e., validating current association between the data point and an entity. In other words, verifying that the data point is, at this point in time, a data point that is associated with the entity. In specific embodiments of the system, the monitoring/checking validation status 920 includes generating and initiating communication of a re-validation request 930 via the distributed communication network 200. In those embodiments in which the data point is an electronic mail address (email address), the re-validation request 930 may be communicated to an email server 500, in the form of a test email to the entity or a Simple Mail Transfer Protocol (SMTP) check to the email server associated with the domain name. In other embodiments of the invention, in which the data point is a telephone number or physical address, the re-validation request 930 may be communicated to an entity's apparatus 510 (e.g., mobile communication device), in the form of a voice call or text/SMS (Short Message Service) message or to the locale 510 associated with the entity, in the form of a mailing.

In other embodiments of the system, re-validating association 330 between the data point and an entity includes accessing 940, via the distributed communication network 200, information 372 associated with the data point. For example, the information may be stored or otherwise accessible, at publically-accessible databases 600 and/or social media websites 700. The system 100 may further include a data analytics engine (not shown in FIG. 2) that analyzes the information accessed and retrieved from the publically-accessible databases 600 and/or social media websites 700 to determine if matches exist between the data point and the information. In specific embodiments of the invention, a confidence level/score may be determined based on the completeness of the match(es), the volume of matches, the types of publically-accessible databases 600 and/or social media websites 700 from which the matched information came from and the like. In specific embodiments of the system, the confidence level/score may be compared to a threshold confidence level/score to determine if the data point can be deemed valid. The data analytics engine may be implemented in conjunction with a heuristics engine (not shown in FIG. 1) that takes into account historical data associated with previous results of the data analytics engine as they apply to the entity and/or the specific data point being validated.

Referring to FIG. 3 a block diagram is presented of the apparatus 300, which is configured for validating data points in a data record, in accordance with embodiments of the present invention. In addition to providing greater detail, FIG. 3 highlights various alternate embodiments of the invention. The apparatus 300 may include one or more of any type of computing device, such as one or more servers, personal computers or the like. The present apparatus and methods can accordingly be performed on any form of one or more computing devices.

The apparatus 300 includes a computing platform 302 that can receive and execute algorithms, such as routines, and applications. Computing platform 302 includes memory 304, which may comprise volatile and non-volatile memory, such as read-only and/or random-access memory (RAM and ROM), EPROM, EEPROM, flash cards, or any memory common to computer platforms. Further, memory 304 may include one or more flash memory cells, or may be any secondary or tertiary storage device, such as magnetic media, optical media, tape, or soft or hard disk. Moreover, memory 404 may comprise cloud storage, such as provided by a cloud storage service and/or a cloud connection service.

Further, computing platform 302 also includes processor 306, which may be an application-specific integrated circuit ("ASIC"), or other chipset, processor, logic circuit, or other data processing device. Processor 306 or other processor such as ASIC may execute an application programming interface ("API") 308 that interfaces with any resident programs, such as data point validation module 310 and routines, sub-modules associated therewith or the like stored in the memory 304 of the apparatus 300, as well as any non-resident programs accessible via the distributed computing network (200 of FIG. 1).

Processor 306 includes various processing subsystems (not shown in FIG. 3) embodied in hardware, firmware, software, and combinations thereof, that enable the functionality of apparatus 300 and the operability of the apparatus on a network. For example, processing subsystems allow for initiating and maintaining communications and exchanging data with other networked devices, such as the databases and servers shown in FIG. 1. For the disclosed aspects, processing subsystems of processor 306 may include any subsystem used in conjunction with data point validation module 310 and related algorithms, sub-algorithms, modules, sub-modules thereof.

Computer platform 302 may additionally include communications module (not shown in FIG. 3) embodied in hardware, firmware, software, and combinations thereof, that enables communications among the various components of the apparatus 300, as well as between the other networked devices. Thus, communication module may include the requisite hardware, firmware, software and/or combinations thereof for establishing and maintaining a network communication connection.

The memory 304 of apparatus 300 stores data point validation module 310 which is configured to validate data points entered into a data record, in accordance with embodiments of the present invention. As previously noted, in those embodiments in which the data record is an electronic data record, the data point validation 310 may be implemented in conjunction with the electronic data record, such that entry of data point and/or completion of the data record triggers automatic validation of a data points and/or all or a portion of the data points in the data record.

In a specific embodiment of the invention, the data record may comprise a contact record, which includes various data points associated with an entity (i.e., an individual or a group of individuals). For example, the data points may include, but are not limited to name(s), email address(es), telephone number(s), physical address(es), birthdate(s), social security number(s), marital status and the like. The present invention provides for validating some, if not all, of the data points in the contact record.

The data point validation module 310 is configured to validate the correctness/accuracy and/or existence 320 of the data point. In this regard the module 310 is configured to generate and initiate communication of a validation existence request 340 that serves to verify the existence of the data point. For example, in those embodiments in which the data record is a contact record and the data point is an email address, the validation existence request 340 may be a call out to an email address checker 342 that verifies the existence of the email address and/or the existence of the domain name. In other embodiments, in which the data record is a contact record and the data point is a physical address, the validation existence request 340 may be a call out to a publically accessible address database (e.g., postal service database or the like) for performing a physical address check 344 that verifies the existence of the physical address. In specific embodiments if the validation existence request 340 results in an invalid or incorrect data point, the validation existence response 346, returned from the queried database or server, may include suggested valid data points 348, such as suggested physical addresses (e.g., suggested zip code, suggested street number and the like), suggested email addresses or the like.

Additionally, validation of the correctness/accuracy 320 of data points may include one or more correctness algorithms/routines 350 that configured to validate that the data point has correct syntax, punctuation, format and the like. For example, in those embodiments in which the data record is a contact record and the data point is an email address, the correctness algorithm 350 may check for proper email address format, e.g., inclusion of an "@" sign, proper domain and/or domain name and the like. In specific embodiments if the correctness algorithm 350 results in an invalid or incorrect data point, the response may include suggested correct data points 348, such as a suggested correct email addresses, including the "@" sign, a corrected domain and/or a corrected domain name or the like.

In addition, the data point validation module 310 is configured to validate the association between an entity and the data point (i.e., in other words, validate that the data point is, in fact, associated and/or related to the entity, for example, in those embodiments in which the data record is a contact record and the data point is an email address, verify that the email address is an email address held by or accessible to the entity/contact). In this regard the module 310 is configured to generate and initiate communication of a validation association request 360 that serves to verify the association between the data point and the entity/contact. For example, in those embodiments in which the data record is a contact record and the data point is an email address, the validation association request 360 may be a test email 361 sent to the entity or an SMTP check 362 sent to the domain server. In other embodiments of the invention, in which the data record is a contact record and the data point is a telephone address, the validation association request 360 may be a text/SMS message 363 sent to the telephone number or an automated or non-automated voice call 364 made to the telephone number 364. In other embodiments, in which the data record is a contact record and the data point is a physical address, the validation association request 360 may be a mailing 365 to the physical address. In other embodiments, the validation association request 360 may take the form of any other 366 electronic or non-electronic communication.

In those embodiments in which the data point is an email address, a telephone number, physical address or the like, the test email 361, text/SMS message 363, voice call 364 or mailing 365 may include a numeric or alphanumeric validation 368 code or the like, which the recipient can provide in an email, text or voice call validation response 367 to validate that the email address, telephone number and/or physical address is associated with the entity. It should be noted that validation association request 360 nor response does not need to be the same as the data point being validated. In other words, a physical address can be validated by sending an email request to the entity/contact, and the entity/contact may respond via text/SMS message.

In still further embodiments of the invention, validation of the association 330 between the data point and the entity may include accessing 370, via the distributed communication network, information 372 that is associated/related to the entity (i.e., information that matches at least a portion of the data point). As previously discussed in relation to FIG. 1, such information 372 may be located/stored at public databases 600 (i.e., databases that are publically accessible and searchable absent password protection) or social media websites 700, such as business-related social media websites and/or communal social media websites.

Once the information 372 has been accessed and/or retrieved from the databases 600 and/or websites 700, a data analytics engine 374 is implemented to analyze the information 372 to determine if matches exist between the data point and the information 372. In specific embodiments of the invention, a confidence level/score 374 may be determined based on the completeness of the match(es), the volume of matches, the types of publically-accessible databases 600 and/or social media websites 700 from which the matched information came from and the like. In specific embodiments of the system, the confidence level/score may be compared to a threshold confidence level/score to determine if the data point can be deemed valid. Further, the data analytics engine 374 may be implemented in conjunction with a heuristics engine (not shown in FIG. 3) that takes into account historical data associated with previous results of the data analytics engine as they apply to the entity and/or the specific data point being validated.

The memory 304 of apparatus 300 may, in certain embodiments of the invention, store data point determination module 380 that is configured to automatically determine one or more data points. In specific embodiments of the invention, the data point determination module 380 is implemented to determine data points in response to determining an invalid data point(s) 382. In other embodiments of the invention, the data point determination module 380 is implemented to determine additional valid data points 384 (e.g., additional email addresses, telephone numbers or the like currently used by the entity). Data point determination module 380 may be configured to determine valid data points by accessing 370, via the distributed communication network, information 372 that is associated/related to the entity (i.e., information that matches at least a portion of the data point). As previously discussed above in relation to the validation process, such information 372 may be located/stored at public databases 600 (i.e., databases that are publically accessible and searchable absent password protection) or social media websites 700, such as business-related social media websites and/or communal social media websites.

Once the information 372 has been accessed and/or retrieved from the databases 600 and/or websites 700, a data analytics engine 386 is implemented to analyze the information 372 to determine if matches exist between the entity and/or validated data points associated with the entity and the information 372. The data analytics engine 386 may the same data analytics engine 374 used for validating data points or it may be a stand-alone data analytics engine 386. In specific embodiments of the invention, a confidence level/score 388 may be determined based on the completeness of the match(es), the volume of matches, the types of publically-accessible databases 600 and/or social media websites 700 from which the matched information came from, the date stamp associated with the matched information and the like. In specific embodiments of the system, the confidence level/score may be compared to a threshold confidence level/score to determine if matched information can be deemed a valid data point. Further, the data analytics engine 374 may be implemented in conjunction with a heuristics engine (not shown in FIG. 1) that takes into account historical data associated with previous results of the data analytics engine as they apply to the entity and/or the specific data point being validated. In those embodiments in which the data point determination module 380 is implemented to determine additional valid data points 384 further data analytics 386 may be implemented to determine a usage priority for the same-type valid data points (e.g., which of the valid email addresses the entity/contact uses the most).

Referring to FIG. 4 a block diagram is presented of the apparatus 900, which is configured for monitoring or checking the validation status, otherwise referred to as re-validation, of data points in a data record, in accordance with embodiments of the present invention. In addition to providing greater detail, FIG. 4 highlights various alternate embodiments of the invention. The apparatus 400 may include one or more of any type of computing device, such as one or more servers, personal computers or the like. In addition, functionality shown in FIG. 4 may be incorporated in the apparatus shown and described in FIG. 3. The present apparatus and methods can accordingly be performed on any form of one or more computing devices.

The apparatus 900 includes a computing platform 902 that can receive and execute algorithms, such as routines, and applications. Computing platform 902 includes memory 904, which may comprise volatile and non-volatile memory, such as read-only and/or random-access memory (RAM and ROM), EPROM, EEPROM, flash cards, or any memory common to computer platforms. Further, memory 904 may include one or more flash memory cells, or may be any secondary or tertiary storage device, such as magnetic media, optical media, tape, or soft or hard disk. Moreover, memory 904 may comprise cloud storage, such as provided by a cloud storage service and/or a cloud connection service.

Further, computing platform 902 also includes processor 906, which may be an application-specific integrated circuit ("ASIC"), or other chipset, processor, logic circuit, or other data processing device. Processor 406 or other processor such as ASIC may execute an application programming interface ("API") 908 that interfaces with any resident programs, such as data point re-validation monitoring module 910 and routines, sub-modules associated therewith or the like stored in the memory 904 of the apparatus 900.

Processor 906 includes various processing subsystems (not shown in FIG. 4) embodied in hardware, firmware, software, and combinations thereof, that enable the functionality of apparatus 900 and the operability of the apparatus on a network. For example, processing subsystems allow for initiating and maintaining communications and exchanging data with other networked devices, such as those databases and servers shown in FIG. 2. For the disclosed aspects, processing subsystems of processor 906 may include any subsystem used in conjunction with data point re-validation monitoring module 910 and related algorithms, sub-algorithms, modules, sub-modules thereof.

Computer platform 902 may additionally include communications module (not shown in FIG. 4) embodied in hardware, firmware, software, and combinations thereof, that enables communications among the various components of the apparatus 900, as well as between the other networked devices. Thus, communication module may include the requisite hardware, firmware, software and/or combinations thereof for establishing and maintaining a network communication connection.

The memory 904 of apparatus 900 stores data point re-validation monitoring module 910 which is configured to monitor, over time, or otherwise check the validation status of data points in a data record, in accordance with embodiments of the present invention. As discussed in relation to FIG. 2, in specific embodiments of the invention, the data point re-validation module 910 is implemented on a continuous basis 912 (i.e., daily or the like). In this regard, the re-validation or a portion of the re-validation may occur in real-time or near real-time depending the ability to access validation-related information in real-time or near real-time. In other embodiments of the invention, the data point re-validation monitoring module 910 is implemented on a periodic basis 914, such as a predetermined scheduled basis. In such instances, certain validations/tests/checks included in the overall validation process may each have a specified predetermined schedule, such that, one or more specific validations/checks may occur more frequently (e.g., once a day, once a week, once a month or the like), while other specific validation/checks may occur less frequently (e.g., once every six months, once every year or the like). The frequency at which validations/checks are performed may depend on the level of importance of the data point, the ability to continually access the validation information and the any other relevant factors.

In other embodiments of the invention, the data point re-validation monitoring module 910 is configured to be implemented on a triggering event basis 916, such that, notification of a triggering event automatically triggers/activates the data point re-validation monitoring module 910 for re-validating one or more of the data points in the data record. In specific embodiments, the type of triggering event may determine which data points in the data record are to be re-validated. For example, in those embodiments in which the data record is a contact record, notification of change in employers or employment status may be the triggering event that automatically results in re-validation of specific data points (e.g., email address, telephone number and the like) or, in some instances, re-validation of all of the data points that are configured for validation.

The data point re-validation module 310 is configured to monitor/check validation status 920, which may, in certain embodiments include, validation of the existence of the data point to insure/verify that the data point currently exists (i.e., verification that an email address is still valid). In this regard the module 910 may be configured to generate and initiate communication of a validation existence request 922 that serves to verify the continued existence of the data point. For example, in those embodiments in which the data record is a contact record and the data point is an email address, the validation existence request 340 may be a call out to an email address checker that verifies the existence of the email address and/or the existence of the domain name. In response to communicating the validation existence request 922, the module 910 receives a response that serves to either re-validate the data point or invalidate the data point.

In addition, the data point re-validation monitoring module 910 is configured to validate the association between an entity and the data point (i.e., in other words, validate that the data point is, in fact, currently associated and/or related to the entity, for example, in those embodiments in which the data record is a contact record and the data point is an email address, verify that the email address remains an email address held by or accessible to the entity/contact). In this regard the module 930 is configured to generate and initiate communication of a validation association request 930 that serves to verify the current association between the data point and the entity/contact. For example, in those embodiments in which the data record is a contact record and the data point is an email address, the re-validation association request 930 may be a test email 931 sent to the entity or an SMTP check 932 sent to the domain server. In other embodiments of the invention, in which the data record is a contact record and the data point is a telephone address, the re-validation association request 930 may be a text/SMS message 933 sent to the telephone number or an automated or non-automated voice call 934 made to the telephone number. In other embodiments, in which the data record is a contact record and the data point is a physical address, the re-validation association request 930 may be a mailing 935 to the physical address. In other embodiments, the re-validation association request 930 may take the form of any other 936 electronic or non-electronic communication.

In those embodiments in which the data point is an email address, a telephone number, physical address or the like, the test email 931, text/SMS message 933, voice call 934 or mailing 935 may include a numeric or alphanumeric re-validation code 938 or the like, which the recipient can provide in an email, text or voice call validation response 937 to validate that the email address, telephone number and/or physical address is associated with the entity. It should be noted that re-validation association request 930 nor response 937 does not need to be the same as the data point being validated. In other words, a physical address can be validated by sending an email request to the entity/contact, and the entity/contact may respond via text/SMS message.

In still further embodiments of the invention, monitoring/checking of validation status 920 may include accessing 940, via the distributed communication network, information 372 that is associated/related to the entity (i.e., information that matches at least a portion of the data point). As previously discussed in relation to FIG. 1, such information 372 may be located/stored at public databases 600 (i.e., databases that are publically accessible and searchable absent password protection) or social media websites 700, such as business-related social media websites and/or communal social media websites.

Once the information 372 has been accessed and/or retrieved from the databases 600 and/or websites 700, a data analytics engine 942 is implemented to analyze the information 372 to determine if matches exist between the data point and the information 372. In specific embodiments of the invention, a confidence level/score 944 may be determined based on the currency of the information matched to the data point, the completeness of the match(es), the volume of matches, the types of publically-accessible databases 600 and/or social media websites 700 from which the matched information came from and the like. In specific embodiments of the system, the confidence level/score may be compared to a threshold confidence level/score to determine if the data point can be deemed valid. Further, the data analytics engine 942 may be implemented in conjunction with a heuristics engine (not shown in FIG. 4) that takes into account historical data associated with previous results of the data analytics engine as they apply to the entity and/or the specific data point being validated.

In specific embodiments of the invention, monitoring/checking validation status 920 may include a dormancy checker 950 that is configured to determine a current inactive use period 952 for a data point. For example, in those embodiments in which the data record is a contact record and the data point is an email address, the dormancy checker 950 may determine a current inactive use period 952 for the email account (i.e., the current period of time during which the entity has not accessed or used the email account). In specific embodiments of the invention a dormancy period threshold may be set, such that a dormancy period exceeding the threshold would result in invalidation of the data point.

The memory 304 of apparatus 300 may, in certain embodiments of the invention, store data point determination module 380 that is configured to automatically determine one or more data points. In specific embodiments of the invention, the data point determination module 380 is implemented to determine data points in response to determining an invalid data point(s) 382. In other embodiments of the invention, the data point determination module 380 is implemented to determine, on a continual or periodic basis, additional valid data points 384 (e.g., additional email addresses, telephone numbers or the like currently used by the entity). Data point determination module 380 may be configured to determine valid data points by accessing 370, via the distributed communication network, information 372 that is associated/related to the entity (i.e., information that matches at least a portion of the data point). As previously discussed above in relation to the validation process, such information 372 may be located/stored at public databases 600 (i.e., databases that are publically accessible and searchable absent password protection) or social media websites 700, such as business-related social media websites and/or communal social media websites.

Once the information 372 has been accessed and/or retrieved from the databases 600 and/or websites 700, a data analytics engine 386 is implemented to analyze the information 372 to determine if matches exist between the entity and/or validated data points associated with the entity and the information 372. The data analytics engine 386 may the same data analytics engine 374 used for validating data points or it may be a stand-alone data analytics engine 386. In specific embodiments of the invention, a confidence level/score 388 may be determined based on the completeness of the match(es), the volume of matches, the types of publically-accessible databases 600 and/or social media websites 700 from which the matched information came from, the date stamp associated with the matched information and the like. In specific embodiments of the system, the confidence level/score may be compared to a threshold confidence level/score to determine if matched information can be deemed a valid data point. Further, the data analytics engine 374 may be implemented in conjunction with a heuristics engine (not shown in FIG. 1) that takes into account historical data associated with previous results of the data analytics engine as they apply to the entity and/or the specific data point being validated. In those embodiments in which the data point determination module 380 is implemented to determine additional valid data points 384 further data analytics 386 may be implemented to determine a usage priority for the same-type valid data points (e.g., which of the valid email addresses the entity/contact uses the most).

Thus, systems, apparatus, methods, and computer program products herein described in detail below provide automated validation of data points within a data record. Specifically, embodiments of the invention provide for validating the correctness of a data point, as well as, the association between the data point and a related entity. Moreover, in specific embodiments of the invention, in which data points are determined to be invalid, valid data points are automatically determined/identified. As such, the present invention provides an effective, efficient and accurate means for automatically validating data points in a data record.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for automated validation of data points within a data record, the system comprising:
one or more distributed electronic communication networks that are configured to provide network access to information associated with a data record;
a computing platform disposed within the distributed electronic communication network and including a memory and a processor in communication with the memory;
a data point validation module stored in the memory, executable by the processor and configured to validate (1) correctness of the data point, and (2) association between the entity and the data point by performing at least one of (i) communicating, via one or more of the distributed electronic communication networks, a validation request to an entity associated with the data record, and (ii) accessing, via one or more of the distributed electronic communication networks, the information associated with the data record; and
a data point determination module stored in the memory, executable by the processor and configured to, in response to the data point validation module determining that the data point is invalid in terms of the association between the entity and the data point, access data point-related information from at least one of one or more social media sites and one or more publically accessible databases to identify a valid data point associated with the entity.

2. The system of claim 1, wherein data point validation module is further configured to perform the at least one of (i) communicating, via the one or more of the distributed electronic communication networks, the validation request to the entity associated with the data record, and (ii) accessing, via the one or more of the distributed electronic communication networks, the information associated with the data record in response to entry of the data point within the data record or completion of the data record.

3. The system of claim 1, wherein the data point validation module is further configured to, in response to communicating the validation request to an entity associated with the data record receive a validation response from the entity that either validates the correctness of the data point or validates the association between the entity and the data point.

4. The system of claim 1, wherein the data point validation module is further configured to, in response to communicating the validation request to an entity associated with the data record, receive a validation response from the entity that invalidates the correctness of the data point and provides one or more suggestions for a correct data point.

5. The system of claim 1, wherein the data point validation module is further configured to, in response to accessing the information associated with the data record, retrieve and analytically analyze the information to determine one or more matches in the information to the data point.

6. The system of claim 1, wherein the data point determination module is further configured to identify the valid data point by analytically analyzing the data point-related information to determine (i) a level of confidence that the valid data point is associated with the entity, and (ii) and the level of confidence exceeds a threshold for data point validity.

7. The system of claim 1, further comprising a data point determination module stored in the memory, executable by the processor and configured to access data point-related information from at least one of one or more social media sites and one or more publically accessible databases to identify a one or more additional data points associated with the entity, wherein the additional data points are of a same type as the data point.

8. The system of claim 7, wherein the data point determination is module is further configured to determine entity priority for the one or more additional data points and the data point, wherein entity priority defines an entity prevalence in using the data point.

9. The system of claim 1, wherein the data point is an email (electronic mail) address and wherein the data point validation module is further configured to validate the correctness of the email address in terms of syntax, domain and domain name, and validate that the email address is associated with the entity.

10. The system of claim 9, wherein the data point validation module is further configured to validate that the email address is associated with the entity by performing at least one of sending an email to the email address and conducting a SMTP (Simple Mail Transfer Protocol) check at a server associated with a domain name in the email address.

11. The system of claim 1, wherein the data point is a telephone number and wherein the data point validation module is further configured to, validate that the telephone number is associated with the entity by, at least one of, making an automated voice call to the telephone number and communicating a text message to the telephone number, wherein the automated voice call and the text message are configured to request the entity respond to the request with a designated code to validate the telephone number.

12. The system of claim 1, wherein the data point is a physical address and wherein the data point validation module is further configured to validate the correctness of the physical address by communicating with a publically-accessible address registry and validate that the physical address is associated with the entity by at least one of (i) retrieving the information associated with the data record, and analytically analyze the information to determine one or more matches in the information to the physical address, (ii) making an automated voice call or communicating a text message to the entity, wherein the automated voice call and the text message are configured to require the entity to respond with a designated code to validate the physical address, and (iii) sending an information packet to the physical address, wherein the information packet requests that the entity respond to the request with a designated code to validate the physical address.

13. An apparatus for automated validation of data points within a data record, the system comprising:
 a computing platform disposed within the distributed electronic communication network and including a memory and a processor in communication with the memory;
 a data point validation module stored in the memory, executable by the processor and configured to validate (1) correctness of the data point, and (2) association between the entity and the data point by performing at least one of (i) communicating, via one or more distributed electronic communication networks, a validation request to an entity associated with the data record, and (ii) accessing, via one or more distributed electronic communication networks, information associated with the data record; and
 a data point determination module stored in the memory, executable by the processor and configured to, in response to the data point validation module determining that the data point is invalid in terms of the association between the entity and the data point, access data point-related information from at least one of one or more social media sites and one or more publically accessible databases to identify a valid data point associated with the entity.

14. The apparatus of claim 13, wherein the data point validation module is further configured to, in response to communicating the validation request to an entity associated with the data record, receive a validation response from the entity that either validates the correctness of the data point or validates the association between the entity and the data point.

15. The apparatus of claim 13, wherein the data point validation module is further configured to, in response to communicating the validation request to an entity associated with the data record, receive a validation response from the entity that invalidates the correctness of the data point and provides one or more suggestions for a correct data point.

16. The apparatus of claim 13, wherein the data point validation module is further configured to, in response to accessing the information associated with the data record, retrieve and analytically analyze the information to determine one or more matches in the information to the data point.

17. A computer program product for automated validation of data points within a data record, the computer program product comprising a non-transitory computer-readable storage medium having computer-executable instructions for:
 validating (1) correctness of the data point, and (2) association between the entity and the data point by performing at least one of (i) communicating, via one or more distributed electronic communication networks, a validation request to an entity associated with the data record, and (ii) accessing, via one or more distributed electronic communication networks, information associated with the data record; and
 in response to determining that the data point is invalid in terms of the association between the entity and the data point, accessing data point-related information from at least one of one or more social media sites and one or more publically accessible databases to identify a valid data point associated with the entity.

18. The computer program product of claim 17, wherein the instructions further include, in response to communicating the validation request to an entity associated with the data record, receiving a validation response from the entity that either validates the correctness of the data point or validates the association between the entity and the data point.

19. The computer program product of claim 17, wherein the instructions further include, in response to access the information associated with the data record, retrieving and analytically analyzing the information to determine one or more matches in the information to the data point.

* * * * *